(12) United States Patent
Flear et al.

(10) Patent No.: US 6,217,938 B1
(45) Date of Patent: Apr. 17, 2001

(54) METHOD OF SEALING AN EDGE JOINT ON A VEHICLE HOOD

(75) Inventors: Paul R. Flear, Shelburne; Michael Roy, Brampton, both of (CA)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/410,684

(22) Filed: Oct. 1, 1999

(51) Int. Cl.[7] ........................................ B05D 5/00
(52) U.S. Cl. ............................ 427/284; 427/287
(58) Field of Search ........................ 427/284, 287, 427/393.4

(56) References Cited

U.S. PATENT DOCUMENTS

| | | |
|---|---|---|
| 256,611 | 4/1882 | Askew . |
| 912,277 | 4/1909 | Benson . |
| 3,032,367 | 5/1962 | Thurston . |
| 3,195,380 | 7/1965 | Bicks . |
| 3,261,242 | 7/1966 | Peters . |
| 3,752,463 | 8/1973 | Schilke . |
| 5,071,182 | 12/1991 | Mair . |
| 5,079,822 | 1/1992 | Arai . |
| 5,549,287 | 8/1996 | Loucks . |
| 5,893,799 | 4/1999 | Studley . |

*Primary Examiner*—Brian K. Talbot
(74) *Attorney, Agent, or Firm*—Lawrence J. Shurupoff

(57) ABSTRACT

A normally—concealed edge joint at the front end of a vehicle hood can be sealed against corrosion by applying a bead of viscous sealant material along the length of the joint. The vehicle hood is maintained in an elevated position while the sealant bead is formed on the edge joint. Thereafter the hood is lowered by means of a special purpose implement that includes a hook designed to engage a striker on the hood undersurface. The implement prevents the technician from touching the hood, and possibly disturbing the sealant bead.

8 Claims, 2 Drawing Sheets

METHOD OF SEALING AN EDGE JOINT ON A VEHICLE HOOD

BACKGROUND AND SUMMARY OF THE INVENTION

This invention relates to a vehicle hood construction, and particularly to a method for sealing a normally—concealed edge joint on a vehicle hood. The method utilizes a hand—held implement that can be employed to lower the hood after a flowable viscous sealing material has been applied to the edge joint.

Various hand—operated implements have been devised for manipulating objects and mechanisms. U.S. Pat. No. 3,261,242 discloses a hand—operated implement for removing a radiator cap from the filler opening of a vehicle radiator. U.S. Pat. No. 3,032,367, issued to R. Thurston, discloses a hand—operated tool for lifting a drawbar associated with a farm tractor.

The present invention concerns a method for sealing an edge joint on a vehicle hood, wherein a hand—operated implement is used to lower the hood to a substantially closed position after a bead of viscous sealing material has been applied to the edge joint. By employing this special purpose implement the sealing material on the edge joint remains undisturbed during the hood—lowering operation. The invention is especially useful in a vehicle manufacturing environment, wherein the edge joint sealing operation is performed repetitively on multiple vehicles moving along a vehicle assembly line. Specific features of the invention will be apparent from the attached drawings and description of an apparatus employed in practice of the invention.

DESCRIPTION OF A PREFERRED EMBODIMENT OF THE INVENTION

Figure 1:
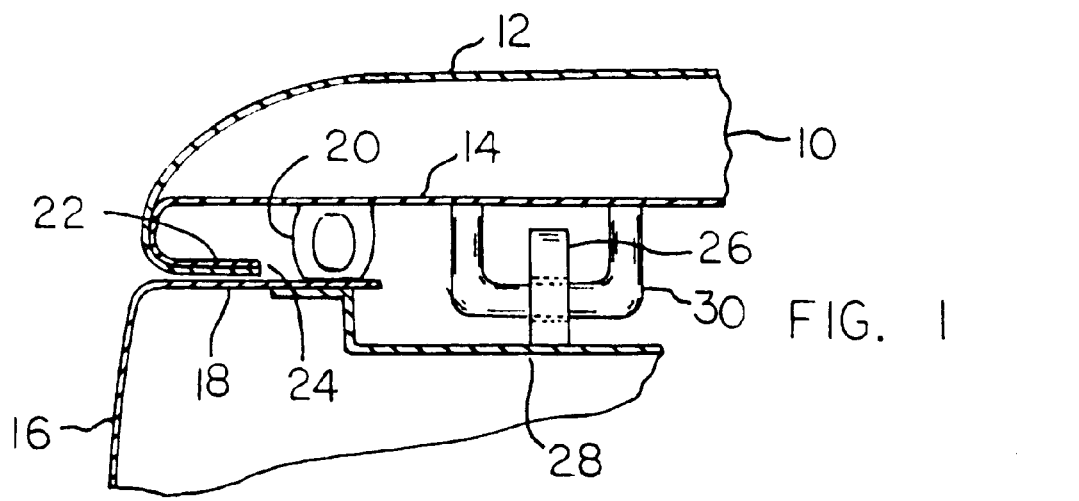
FIG. 1 is a fragmentary sectional view taken through a vehicle hood that is treatable according to the present invention.
Figure 2:
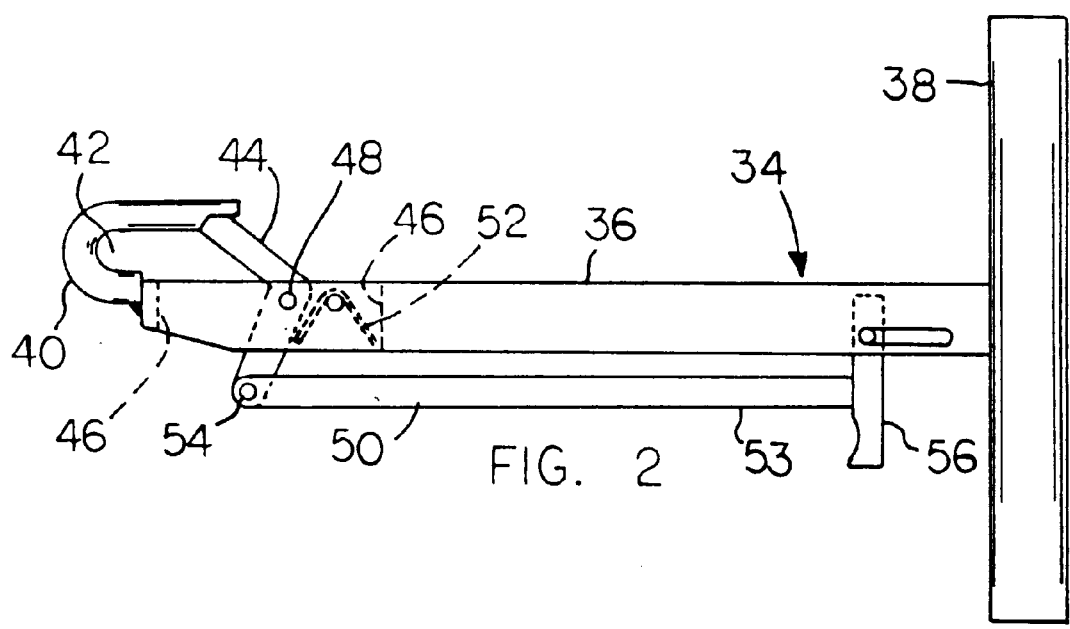
FIG. 2 is a plan view of a hand—operated implement that can be used in practice of the present invention.
Figure 3:
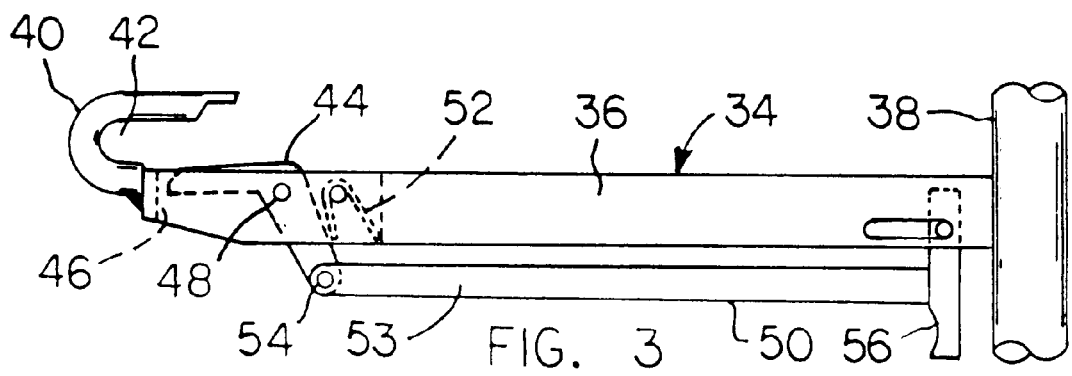
FIG. 3 is a view taken in the same direction as FIG. 2, but showing a gate on the implement in an open position.
Figure 4:
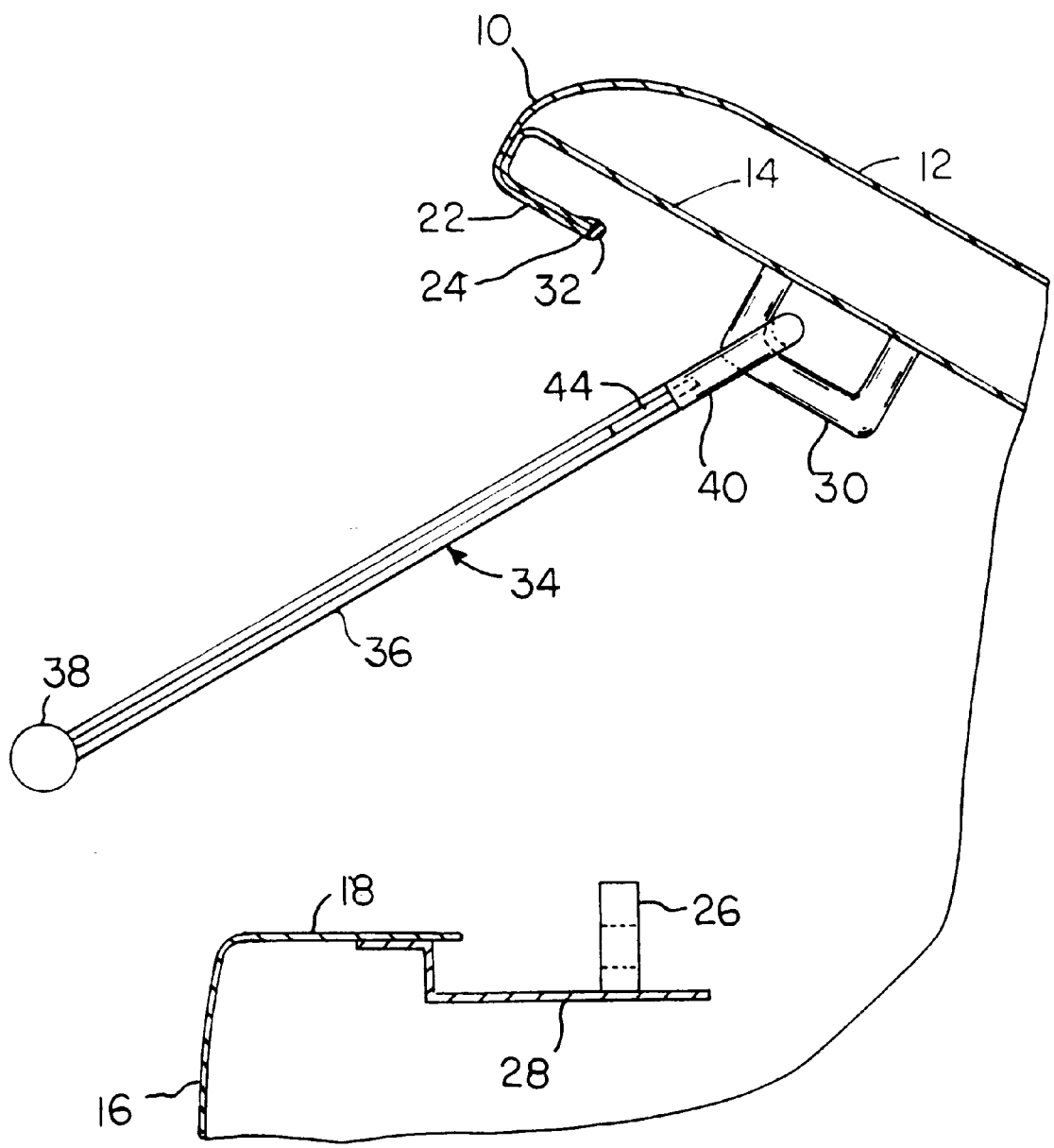
FIG. 4 is a sectional view taken in the same direction as FIG. 1, but showing the vehicle hood in an elevated position, whereby the implement of FIGS. 2 and 3 can be used to pull the hood downwardly to a substantially—closed position without disturbing a sealing material applied to an edge joint proximate to the hood front edge.

FIGS. 1 through 4 show an apparatus that can be used or treated during practice of the present invention. FIGS. 1 and 4 fragmentarily show a vehicle hood 10 that includes an exterior panel 12 and an interior reinforcing panel 14. The hood is hingedly connected to the vehicle body by a spring—hinge mechanism (not shown), whereby the hood can be moved between a lowered closed position (FIG. 1) and a raised open position (FIG. 4).

As shown in FIG. 1, the front edge of the hood overlies the upper edge of an upstanding conventional grille 16 that is located in front of the engine radiator, not shown. Grille 16 includes a horizontal wall 18 that aligns with a weatherstrip 20 carried by interior reinforcing panel 14 of the vehicle hood.

The front edge areas of exterior hood panel 12 and reinforcing panel 14 are reversely turned, as at 22, to form a normally—concealed edge joint 24. Facing areas of the reversely—turned walls 22 are spot—welded together at spaced points along the edge joint, to provide strong rigid connections between the front edges of hood panels 12 and 14.

When hood 10 is in the lowered position (FIG. 1), weatherstrip 20 abuts wall 18 prevent rain water from entering into the engine compartment. The weatherstrip is broken at the vehicle centerline to permit hand access to a manual latch 26 that is mounted on a structural wall 28 of the vehicle body. Latch 26 is adapted to engage a U-shaped latch striker bar 30 that extends downwardly from interior panel 14 of the hood, whereby the hood is latched in the closed position (FIG. 1).

A Bowden wire (not shown) extends from latch 26 to an actuator handle in the vehicle driver compartment, for facilitating a latch unlock action from within the vehicle passenger area. Latch 26 has an accessible handle for completing the process of disengaging the latch from striker bar 30.

It has been discovered that under some conditions the reversely turned walls 22 at the front edge of hood can corrode during service. It is theorized that rain water migrates along the upper surface of horizontal wall 18, where it collects near weatherstrip 20. Moisture in edge joint 24 apparently produces undesired corrosion on walls 22. It is believed that by providing a moisture seal along edge joint 24 such corrosion can be prevented or minimized.

Under the present invention a bead of flowable viscous sealant material 32 is provided along the entire length of edge joint 24, as shown in FIG. 4. Initially, hood 10 is raised to an elevated position, as shown in FIG. 4, after which a caulking gun is passed along edge joint 24 to form the sealant bead 32.

After joint 24 has been sealed by bead 32 it is necessary that hood 10 be returned to a lowered position wherein striker bar 30 is located slightly above latch 26. During the hood—lowering operation it is necessary that sealant bead 32 remain undisturbed along the entire length of edge joint 24. To insure such a condition, it is proposed that the hood—lowering operation be performed with the hand—operated implement depicted in FIGS. 2 and 3.

As shown in FIGS. 2 and 3 implement 34 includes a laminated bar 36 having a transverse handle 38 at its right end. A U-shaped hook 40 is welded, or otherwise attached, to the left end of bar 36. The space 42 circumscribed by the hook is slightly larger than the diameter of the bar stock used to form striker bar 30, such that the hook 40 can be attached to the striker bar, as depicted in FIG. 4.

In order to prevent hook 40 from slipping off the striker bar 30, implement 34 is provided with a swingable gate 44. FIG. 2 shows gate 44 in the closed position, wherein hook 40 is prevented from disengagement from striker bar 30. FIG. 3 shows gate 44 in the open position, wherein the implement can be manipulated to disengage hook 40 from striker bar 30.

Gate 44 includes a flat lever located within a recess 46 (or cut out) in the central lamination of bar 36. The gate 44 can swing around a pivot pin 48 for movement between the open and closed positions. An actuator linkage 50 is provided on implement 34 for moving gate 44 to the open position. Spring 52, within bar 36, normally biases the gate to the closed position.

Linkage 50 includes an elongated link 53 having a pivot connection 54 with gate 44. An auxiliary handle 56 at the opposite end of the link can be pulled to draw gate 44 to the FIG. 3 open position. When handle 56 is released, spring 52 moves gate 44 to the FIG. 2 closed position.

FIG. 4 shows implement 34 in an operating position wherein hook 40 is temporarily attached to striker bar 30. A technician is able to exert a downward pulling force on handle 38 for lowering hood 10 to a substantially closed position. A squeezing force can then be applied to auxiliary handle 56 to move gate 44 to the open position, such that implement 34 can be manipulated to disengage hook 40 from striker bar 30.

Implement 34 is advantageous in that the hood—lowering operation can be carried out without disturbing the sealant bead 32; the technician's hand never touches reversely turned walls 22 at the front edge of the hood. Also, the hood—lowering operation places the hood in a lowered condition wherein striker bar 30 is slightly above latch 26; reversely turned walls 22 are spaced some distance above horizontal wall 18 so that sealant bead 32 is not disturbed. The technician is precluded from slamming the hood down to the fully latched position in which sealant bead 32 could come into contact with wall 18.

The drawings show a particular hood construction, and a particular relation between the hood and the vehicle grille. However, it will be appreciated that the vehicle hood could take various structural configurations while still utilizing the invention.

What is claimed:

1. A method of forming a moisture—resistant seal along a normally concealed edge joint at the front end of a vehicle hood, said method comprising:
   a. raising the hood to a position wherein the edge joint is accessible to a person standing near the vehicle;
   b. applying a viscous sealing material to the edge joint;
   c. temporarily attaching a pulling implement to a latch striker on an undersurface of the vehicle hood;
   d. exerting a downward pulling force on the implement to lower the hood to a substantially closed condition; and
   e. disengaging the pulling implement from the latch striker.

2. The method of claim 1, wherein step b is performed with a caulking gun.

3. The method of claim 1, wherein step c, includes manipulating the implement so that a hook on an end of the implement partially encircles the latch striker.

4. The method of claim 3, wherein step c further includes manually moving a gate on the hook to a closed position, whereby the hook is prevented from slipping off the latch striker.

5. The method of claim 4, wherein the step of moving the gate to a closed position includes manipulating the implement so that the gate is pressured against the latch striker so that an associated spring on the implement biases the gate to a closed position when the hook is attached to the latch striker.

6. The method of claim 1, wherein step e includes manually moving a gate on a hook of the pulling implement to an open position, whereby the hook can be separated form the latch striker.

7. The method of claim 6, wherein the step of moving the gate to an open position includes pulling a gate—actuator linkage away from the hook, to thereby move the gate to the open position.

8. A method of forming a moisture—resistant seal along a normally concealed edge joint at the front end of a vehicle hood, said method comprising:
   a. raising the hood to an elevated position wherein the edge joint is accessible to a person located near the vehicle;
   b. applying a flowable viscous sealing to the edge joint;
   c. temporarily attaching a pulling implement to a latch striker bar on an undersurface of the vehicle hood;
   d. exerting a downward pulling force on the implement to lower the hood to a substantially closed condition; and
   e. disengaging the pulling implement from the latch striker bar;
   step c including the steps of manipulating the implement so that a hook on an end of the implement partially encircles the latch striker bar, and manually moving a hook gate to a closed position, whereby the hook is prevented from slipping off the latch striker bar;
   step e includes the step of pulling a gate—actuator linkage on the implement away from the hook, to thereby move the gate to open position.

* * * * *